United States Patent
Barraud et al.

(10) Patent No.: US 6,428,893 B1
(45) Date of Patent: Aug. 6, 2002

(54) GRADED INDEX PLASTICS OPTICAL FIBER AND A METHOD OF CONTINUOUSLY FABRICATING A GRADED INDEX PLASTICS OPTICAL FIBER

(75) Inventors: Jean-Yves Barraud, Paris; Dominique Morichere, Massy; Alain Pastouret, Palaiseau; Bernard Boutevin; Alain Rousseau, both of Montpellier, all of (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/409,341

(22) Filed: Sep. 30, 1999

(30) Foreign Application Priority Data

Oct. 1, 1998 (FR) .................................. 98 12288

(51) Int. Cl.[7] .......................... B32B 9/00; B29D 11/00
(52) U.S. Cl. .................. 428/392; 428/375; 264/1.24; 264/1.29; 264/1.6; 264/1.7
(58) Field of Search ...................... 428/392, 325; 264/1.24, 1.29, 1.6, 1.7

(56) References Cited

U.S. PATENT DOCUMENTS

| | | | |
|---|---|---|---|
| 5,425,122 A | * 6/1995 | Matsumura et al. | 385/124 |
| 5,747,610 A | * 5/1998 | Katoot | 526/73 |
| 5,949,942 A | * 9/1999 | O'Connor | 385/129 |
| 6,086,999 A | * 7/2000 | Ilvashenko | 428/375 |
| 6,093,448 A | * 7/2000 | LaFleur et al. | 427/163.2 |
| 6,132,650 A | * 10/2000 | Nakamura | 264/102 |
| 6,200,503 B1 | * 3/2001 | Katoot et al. | 264/102 |

FOREIGN PATENT DOCUMENTS

| | | |
|---|---|---|
| EP | 0 256 765 A1 | 2/1988 |
| EP | 0 425 305 A2 | 5/1991 |
| EP | 0 488 390 A1 | 6/1992 |
| JP | 9-133819 | * 5/1997 |
| JP | 2000-147295 | * 5/2000 |

OTHER PUBLICATIONS

Patent Abstracts of Japan, vol. 097, No. 009, Sep. 30, 1997, corresponding to JP 09 138313 A (Sumitomo Wiring Sys LTD) May 27, 1997.

* cited by examiner

*Primary Examiner*—Cynthia H. Kelly
*Assistant Examiner*—J. M. Gray
(74) *Attorney, Agent, or Firm*—Sughrue Mion, PLLC

(57) ABSTRACT

A method of continuous application of a graded index plastics optical fiber in which the refractive index is highest in the center and decreases progressively towards the periphery, said fiber having a plurality of layers of resin deposited concentrically, the method comprising making a plurality of mixtures, each mixture comprising at least one polymer P and a reactive diluting agent including at least two monomers, then depositing said mixtures in the form of coaxial layers, allowing interdiffusing to take place between the layers, and finally crosslinking the polymer P and/or the reactive diluting agent.

14 Claims, 1 Drawing Sheet

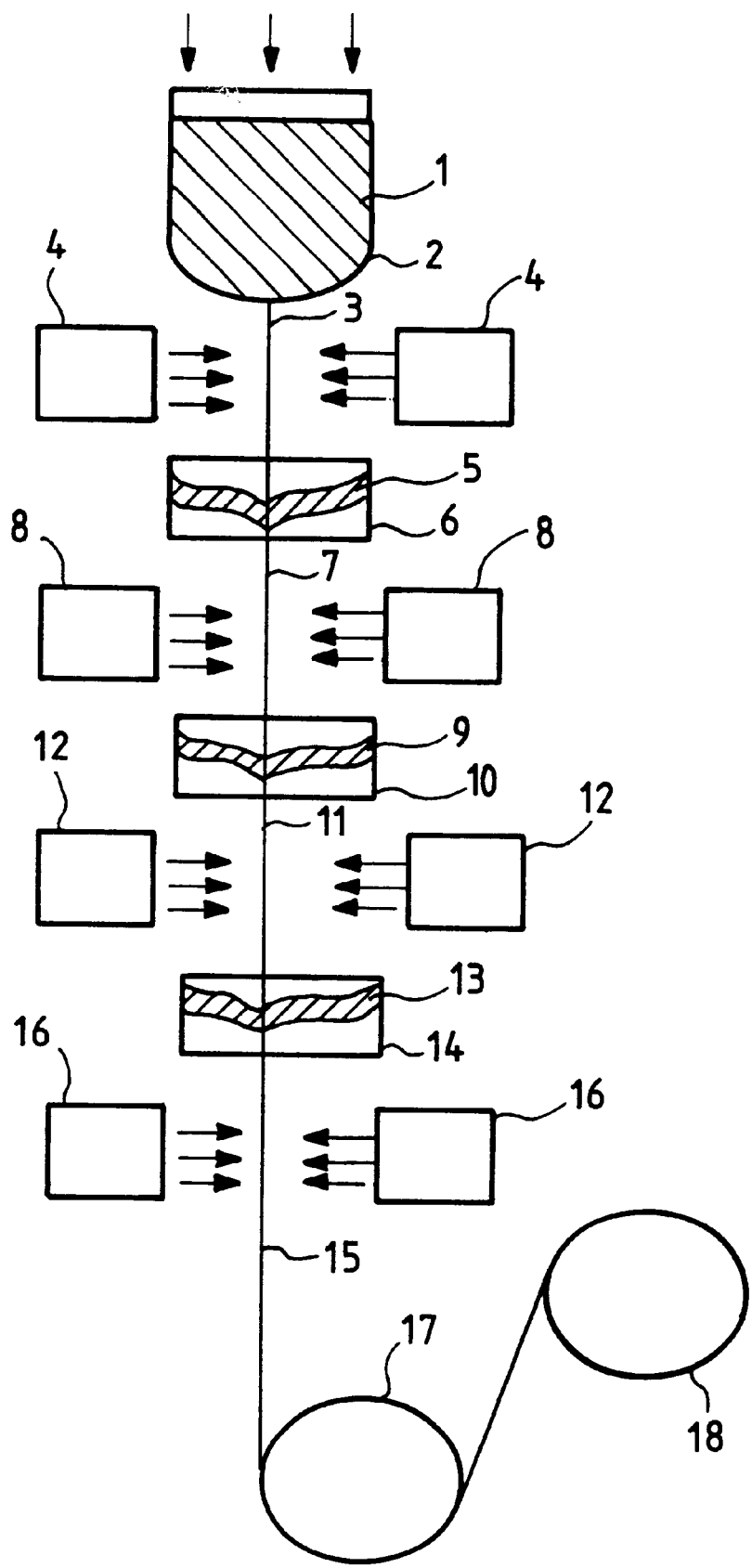

GRADED INDEX PLASTICS OPTICAL FIBER AND A METHOD OF CONTINUOUSLY FABRICATING A GRADED INDEX PLASTICS OPTICAL FIBER

The present invention relates to a graded index plastics optical fiber and to a method of continuously fabricating a graded index plastics optical fiber.

BACKGROUND OF THE INVENTION

Graded index plastics optical fibers which can be used in a band which preferably extends as far as the near infrared are beneficial because they can be used in broadband access networks. At present no such fibers are commercially available, although there has been increasing interest in research on this topic over some fifteen years. Various research approaches have been developed and the corresponding fibers have been synthesized experimentally. Fibers made of polymethacrylate cannot be used in the intended band because the presence of many C—H bonds limits applications to the visible spectrum and to wavelengths shorter than 800 nm. Also, they cannot be used at temperatures of 80° C. and above. One area that once seemed to be more promising is that of fibers essentially made of perfluorinated polymers, but as yet there is no commercially available material for this particular application. There are other research approaches of a hybrid nature.

For example, document WO-A-97/36196 describes a multilayer graded index plastics optical fiber (GIPOF) whose refractive index is higher at the center and decreases progressively towards the periphery, the fiber having a plurality of coaxial layers of (co)polymers selected from the group comprising homopolymers HP1, HP2, . . . , HPn of at least two monomers M1, M2, . . . , Mn and at least one copolymer CP of the monomers Mn, mixed layers of two similar (co)polymers being provided between each layer. The above patent describes two methods of preparing the GIPOF. One method consists in preparing materials for extrusion which are made up of the (co)polymers, extruding them using a coaxial multiple orifice nozzle and allowing the layers to diffuse into one another. That technique based on depositing previously melted polymers does not guarantee uniformly thick layers or reproducible interdiffusion. The other method entails preparing materials for extrusion which are made up of the (co)polymers and the monomers Mn, extruding them using a coaxial multiple orifice nozzle, allowing the layers to interdiffuse, and then photopolymerizing the monomers. For preparing the (co)polymers, that document also mentions that it is possible to part-polymerize them, for example up to at least 50% polymerization, and to continue the reaction by photopolymerization. Any such operation entailing stopping polymerization while it is in progress is essentially non-reproducible. Finally, the GIPOF obtained is made up of layers of resin consisting of inter-diffused polymers of high molecular weight. There is no mention of any crosslinking by photopolymerization in that method. The polymers are therefore not chemically bonded, which leads to the refractive index profile being unstable in terms of duration and temperature.

Patent application JP-A-09 138 313 discloses a method of fabricating GIPOF by applying a solution obtained by diluting a polymer with a substance having a low refractive index in a monomer around a plastics core with the highest index. Polymerizing the monomer produces the first layer of polymer with a lower refractive index than the core. Various layers are deposited in the same manner, with the refractive index decreasing progressively from the center towards the periphery. In the example, the viscosity of the solutions applied to the core is in the range from 5000 poises to 10000 poises, i.e. 500 Pa.s to 1000 Pa.s. The substance with a low refractive index for use in the invention is not polymerizable. The refractive index profile is therefore unstable in terms of duration and temperature.

OBJECTS AND SUMMARY OF THE INVENTION

In the plastics optical fiber of the invention, the refractive index profile is stable in terms of duration and temperature. A fixed three-dimensional structure is created by crosslinking during fabrication of the fiber. Moreover, in the method of fabricating a plastics optical fiber of the invention, choosing the viscosity of the various mixtures enables them to be deposited coaxially and without melting. Consequently said method is highly reproducible, mainly in terms of interdiffusion and of the thickness of the layers, and the refractive index profile is therefore highly reproducible.

The invention also relates to two direct fiber fabrication processes which deposit specific mixtures of polymers whose refractive indeces vary as a function of fluorine content.

The present invention provides a graded index plastics optical fiber in which the refractive index is highest at the center and decreases progressively towards the periphery, said fiber having a substantially homogeneous and amorphous crosslinked structure made up of a material based on monomers and polymers that are at least partly fluorinated.

The invention also provides a method of continuously fabricating a graded index plastics optical fiber in which the refractive index is highest at the center and decreases progressively towards the periphery, said fiber having a plurality of layers of resins deposited concentrically, said method comprising preparing at least two amorphous mixtures each comprising at least one primer, at least one at least partly fluorinated polymer P comprising from 10 to 1000 monomer units, and preferably from 20 to 100 monomer units, said polymer comprising a main chain and at least two reactive groups, generally in a lateral and/or terminal position of the main chain, and a reactive diluting agent comprising at least two monomers M1 and M2 with different refractive indeces, each monomer being at least partly fluorinated and including a reactive group adapted to react with a reactive group of the polymer P, the proportion as a percentage by weight of said polymer P relative to the components of the mixture being practically constant for each mixture and the proportion as a percentage by weight of M1 relative to the sum of monomers of the reactive diluting agent varying significantly from one mixture to another, extruding the first mixture with the highest refractive index to constitute the core, depositing layer(s) of mixture(s) having respective decreasing refractive indeces on said core, interdiffusing each layer with the adjoining layer(s), and crosslinking the polymer P and the monomers of the reactive diluting agent.

The crosslinking is preferably photocrosslinking and the primer is preferably a photoprimer.

In a variant of the method of the invention, the main chain of the polymer P is selected from the group comprising at least partly fluorinated poly(meth)acrylates which can optionally incorporate at least one at least partly fluorinated maleimide type monomer. In a second variant of the method of the invention, the main chain of the polymer P is selected from the group comprising at least partly fluorinated polyethers.

In an embodiment of the method of the invention the reactive groups of the polymer P are at least partly fluorinated polyethers.

In an embodiment of the method of the invention the reactive groups of the polymer P are at least partly fluorinated or chlorinated and of the acrylate, methacrylate or vinyl ether type. An embodiment of this kind also includes derivatives of the above reactive groups such as derivatives of vinyl ethers such as propynylethers.

Finally, the invention provides another method of continuously fabricating a graded index plastics optical fiber in which the refractive index is highest at the center and decreases progressively towards the periphery, said fiber having a plurality of layers of resins deposited concentrically, said method comprising preparing at least two amorphous mixtures each comprising at least one primer, at least one at least partly fluorinated polymer P comprising from 10 to 1000 monomer units and a reactive diluting agent comprising at least two monomers M1 and M2 with different refractive indeces, each monomer being at least partly fluorinated and at least one of the two monomers M1 and/or M2 including at least two reactive groups adapted to react with a reactive group of one of the two monomers M1 or M2, the other of the two monomers M1 or M2 including at least one reactive group adapted to react with a reactive group of one of the two monomers M1 or M2, the proportion as a percentage by weight of said polymer P relative to the sum of the components of the mixture being practically constant for each mixture and the proportion as a percentage by weight of M1 relative to the sum of monomers of the reactive diluting agent varying significantly from one mixture to another, extruding the first mixture with the highest refractive index to constitute the core, depositing layer(s) with respective decreasing refractive indeces on said core, interdiffusing each layer with the adjoining layer(s), and crosslinking the polymer P and the monomers of the reactive diluting agent.

In an embodiment of the method of the invention the monomers of the reactive diluting agent are chosen from the family of alkyl α fluoro or α,β difluoro acrylates or methacrylates, the term "alkyl" designating any at least partly chlorinated or fluorinated hydrocarbon group, and from at least partly chlorinated or fluorinated vinyl ethers.

In an embodiment of the method of the invention, the polymer P is prepared by radical polymerization and controlling the homogeneity of the molecular weights. For example, the polymer P is prepared from at least one monomer PM in the presence of a transfer agent and at least one thermal primer. In this case, the monomer PM is preferably selected from the alkyl α fluoro or α, β difluoro (meth)acrylate family, the term "alkyl" designating any hydrocarbon group that is at least partly chlorinated or fluorinated, and at least partly fluorinated maleimides.

The method of the invention is preferably such that the layers are deposited successively. In a variant of the method of the invention at least partial intermediate crosslinking is performed between depositing each layer of mixture. In another variant of the method of the invention the layers are deposited successively, followed by a single crosslinking step.

The chemical behavior is preferably practically the same. Consequently, the variation in the composition of the mixture of monomers of the reactive diluting agent, mainly enabling refractive index to be modulated as a function of fluorine content, does not have any significant influence on the viscosity, reactivity, or thermal stability of the mixtures.

The plastics optical fiber of the invention has the advantage that it can be used in a waveband extending as far as the near infrared and has low attenuation (a few tens of dB/km) throughout the band.

Another advantage of the optical fiber of the invention is that it because it is crosslinked it can be used at temperatures which are high compared with the temperatures at which prior art plastics optical fibers can be used, e.g. up to at least 125° C.

The fiber obtained in this way has a graded index type refractive index profile that is practically smooth and in which the variation of refractive index between the center and the periphery of the fiber is generally in the range from 0.01 to 0.03. The diameter of the fiber obtained in this way is generally in the range from 300 μm to 1 mm.

The following examples illustrate the invention without limiting its scope.

EXAMPLES

Example 1

Fabrication of a Poly (α fluoro) (meth)acrylate Reactive Polymer

A photoreactive polymer was fabricated with formula (A):

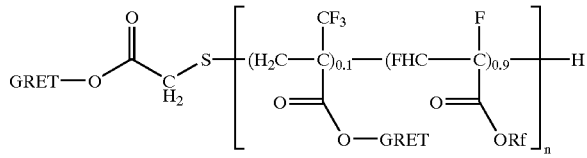

where GRET represents the photocrosslinkable group $-CH_2-CH(OH)-CH_2-O-CO-C(CH_3)=CH_2$ and Rf represents the group $CH(CF_3)_2$ used to adjust the refractive index, and n is an integer.

The first step was to synthesize a precursor polymer, after which the photoreactive groups were introduced into the precursor polymer.

The following raw materials were used to synthesize the precursor polymer: two monomers, α,β-hexafluoroisopropyl difluoroacrylate and α-trifluoromethyl acrylic acid, the transfer agent being thioglycolic acid and the primer being 4,4'-azobis(4-cyano)pentanoic acid (ACPA), in amounts of one mole of transfer agent per 20 moles of monomer and 0.2 mole of primer per 20 moles of monomer. The copolymerization was started thermally, at a temperature of approximately 60° C. A different primer could be used, in which case the temperature, which depends on the nature of the primer, is generally in the range from 60° C. to 120° C. In the present example, the radical copolymerization was performed in the mass. It can easily be performed in the presence of a solvent instead.

A precursor polymer comprising 20 monomer units was therefore finally obtained. The polymer (A) was obtained by reacting three moles of glycidyl methacrylate with one mole of the polymer in the presence of a chromium-based catalyst referred to as Chrome DIPS (diisopropyl-salicylate). The polymer (A) obtained in this way included three methacrylate type reactive groups.

Example 2

Fabrication of Mixtures from the Poly (α fluoro) (meth) acrylate Reactive Polymer (A) of Example 1

Four different mixtures were fabricated including a commercial photoprimer, IRGACURE 651, the reactive polymer of formula (A) from example 1, and a reactive diluting agent made up of two monomers in different proportions depending on the mixture, the two monomers being (a) α-hexafluoroisopropyl fluoroacrylate, whose homopolymer at 20° C. has a refractive index equal to 1.3502, and (b) α,β-trichloroethyl difluoroacrylate, whose homopolymer at 20° C. has a refractive index equal to 1.5063. As an alternative to this, any other photoprimer from the IRGACURE family can be used. Table 1 summarizes the compositions and properties of the mixtures, the quantities being calculated for 700 grams of mixture:

TABLE 1

| Mixture No. | Quantity of (a) (grams) | Quantity of (b) (grams) | Quantity of reactive polymer (grams) | Viscosity of mixture (Pa · s at 20° C.) | Refractive index of mixture at 20° C. |
|---|---|---|---|---|---|
| 1 | 35  | 315 | 359 | 8.2 | 1.4271 |
| 2 | 70  | 280 | 350 | 7.8 | 1.4193 |
| 3 | 105 | 245 | 350 | 7.2 | 1.4115 |
| 4 | 140 | 210 | 350 | 6.9 | 1.4037 |

Thus the ratio as a percentage by weight of the polymer to the sum of the components of the mixture was constant, whereas within the reactive diluting agent the relative proportion as a percentage by weight of M1 relative to M1+M2 varied from one mixture to another. This provided a convenient way to control the viscosity of the various mixtures in a way that varied the refractive index of each mixture.

Example 3

Fabrication of a Graded Index Plastics Optical Fiber from the Mixtures of Example 2, Made from the Poly (α fluoro) (meth)acrylate Reactive Polymer of Example 1

BRIEF DESCRIPTION OF THE DRAWING

The accompanying drawing shows the method of fabricating the plastics optical fiber of the invention. It is a highly diagrammatic representation of the process for fabricating the optical fiber from four mixtures of given viscosity.

MORE DETAILED DESCRIPTION

First, four amorphous mixtures 1, 5, 9 and 13 of controlled viscosity with respective decreasing refractive indeces were prepared as in Example 2.

Referring to the drawing, the controlled viscosity amorphous mixture 1 was placed in a storage vessel 2. The storage vessel 2 was pressurized in order to control its flowrate. The mixture 1 was then extruded to form a core 3 of specified diameter, here equal to 100 μm . The core 3 was then irradiated by passing it through a cylindrical irradiation chamber disposed around the core 3 and containing a U.V. lamp 4. An excimer laser system could be used instead of the system using a U.V. lamp. Three mixtures 5, 9 and 13 were then deposited, each to a thickness of 100 μm. Each of the mixtures 5, 9 and 13 was deposited in succession under pressure as the respective fibers 3, 7 and 11 as previously obtained passed through a corresponding chamber 6, 10 and 14. Each deposition was followed by crosslinking in a respective chamber 8, 12 and 16. Partial hardening was performed by U.V. irradiation in the chambers 4, 8 and 12, which enabled interdiffusion between the layers. Total hardening was performed by U.V. irradiation in the chamber 16, to fix the composition constituting a final fiber 15. A capstan 17 was used to wind the graded index plastics optical fiber 15 as finally obtained onto a spool 18.

The fiber 15 obtained in the above manner was made up of resins constituting a material fixed by crosslinking the polymer and the two monomers constituting the reactive diluting agent in the presence of a primer. All the acrylate functions were consumed to yield a crosslinked polymer structure with substantially no possible mobility between the polymer chains. In this way a material was obtained that was stable in terms of time and temperature, in particular with regard to its refractive index profile.

The refractive index profile of the fiber 15 obtained in the above manner was of the graded index type, and was practically smooth, the variation in the refractive index between the center and the periphery of the fiber being approximately 0.024. The diameter of the fiber obtained in the above manner was in the order of 330 μm.

Of course, the plastics optical fiber of the invention is not limited to the embodiment described hereinabove. For example, at least one resin coating could be deposited on the previously obtained optical fiber to protect it from the surrounding medium and to increase its mechanical strength.

Example 4

Fabrication of Fluorinated Polyether Type Reactive Polymers (B)

Available precursor polymers for reactive polymers include various fluorinated polyether type polymers, diols, including m monomer units, the value of m in accordance with the invention being in the range from 10 to 1000 and preferably in the range from 20 to 100, and wherein the general structure of the chain is:

—(—$OCF_2$—$CF_2$—)$_x$—(—$OCF_2$—)$_y$—, with x+y=m. This is a commercially available product, namely FOMBLIN Z sold by Ausimont, —(—$OCF_2$—$CF(CF_3)$—)$_m$—. This is a commercially available product, namely KRYTOX sold by Du Pont de Nemours, —(—$OCF_2$—$CF_2$—$CF_2$—)$_m$—. This is a commercially available product, namely DEMNUM sold by Daikin, or —(—$OCF_2$—$CF_2$—$CH_2$—)$_m$—. This is a commercially available product, namely DEMNUM H sold by Daikin.

Various polymers (B) were then obtained by reacting 2 moles of methacryloyl chloride with 1 mole of one of the previous precursor polymers. A substantially identical result could be obtained by transesterification of methyl methacrylate in the presence of a catalyst such as zirconium acetyl acetonate. The polymers (B) obtained in the above manner included two acrylate type reactive groups.

Example 5

Fabrication of a Graded Index Plastics Optical Fiber from Mixtures Made from Fluorinated Polyether Type Reactive Polymers (B) from Example 4

For each polymer (B) four mixtures were prepared by the process used in Example 2, after which a plastics optical fiber was fabricated by the process used in Example 3.

Various plastics optical fibers according to the invention were obtained in this way.

What is claimed is:

1. A method of continuous fabrication of a graded index plastics optical fiber in which the refractive index is highest in the center and decreases progressively towards the periphery, said fiber having a plurality of layers of resins deposited concentrically, said method comprising:

preparing at least first and second amorphous mixtures each comprising at least one primer, at least one at least partly fluorinated polymer P comprising from 10 to 1000 monomer units, said polymer comprising a main chain and at least two reactive groups, and a reactive diluting agent comprising at least two monomers M1 and M2 with different refractive indices, each monomer being at least partly fluorinated and including a reactive group adapted to react with a reactive group of the polymer P, the proportion as a percentage by weight of said polymer P relative to the sum of the components of each said mixture being substantially constant for each mixture and the proportion as a percentage by weight of said monomer M1 relative to the sum of monomers of the reactive diluting agent varying substantially from one of said mixtures to the other, extruding the first mixture with the highest refractive index to constitute the core, depositing layer(s) of respective decreasing refractive indices on said core, interdiffusing each layer with the adjoining layer(s), and crosslinking the polymer P and the monomers of the reactive diluting agent.

2. A method according to claim 1, wherein the main chain of the polymer P is selected from the group comprising at least partly fluorinated poly(meth)acrylates.

3. A method according to claim 2, wherein said chain incorporates at least one at least partly fluorinated maleimide type monomer.

4. A method according to claim 1, wherein the main chain of the polymer P is selected from the group comprising at least partly fluorinated polyethers.

5. A method according to claim 1, wherein the reactive groups of said polymer P are at least partly fluorinated or chlorinated and of the acrylate, methacrylate or vinyl ether type.

6. A method according to claim 1, wherein the monomers of the reactive diluting agent are selected from the group consisting of at least partly chlorinated or fluorinated α fluoro or α, β difluoro acrylates or methacrylates, and at least partly chlorinated or fluorinated vinyl ethers.

7. A method according to claim 1, wherein the polymer P is prepared by radical polymerization and by controlling the homogeneity of the masses.

8. A method according to claim 7, wherein the polymer P is prepared from at least one monomer PM in the presence of a transfer agent and at least one thermal primer.

9. A method according to claim 8, wherein the monomer PM is selected from the family of alkyl α fluoro or α,β difluoro (meth)acrylates, the term "alkyl" designating any at least partly chlorinated or fluorinated hydrocarbon group, and from at least partly fluorinated maleimides.

10. A method according to claim 1, wherein the layers are deposited successively.

11. A method according to claim 10, wherein at least partial intermediate crosslinking is performed between depositing each layer of mixture.

12. A method according to claim 10, wherein a single crosslinking is performed after the successive deposition of layers.

13. A method according to claim 1, wherein the crosslinking process is a photocrosslinking process and the primer in each mixture is a photoprimer.

14. A method of continuously fabricating a graded index plastics optical fiber in wich the refractive index is highest in the center and decreases progressively towards the periphery, said fiber having a plurality of layers of resins deposited concentrically, said method comprising:

preparing at least first and second amorphous mixtures each comprising at least one primer, at least one at least partly fluorinated polymer P comprising from 10 to 1000 monomer units and a reactive diluting agent comprising at least two monomers M1 and M2 with different refractive indices, each monomer being at least partly fluorinated and at least one of the two monomers M1 and/or M2 including at least two reactive groups adapted to react with a reactive group of one of the two monomers M1 or M2, the other of the two monomers M1 or M2 including at least one reactive group adapted to react with a reactive group of one of the two monomers M1 or M2, the proportion as a percentage by weight of said polymer P relative to the sum of the components of each said mixture being substantially constant for each mixture and the proportion as a percentage by weight of M1 relative to the sum of monomers of the reactive diluting agent varying substantially from one of said mixtures to another, extruding the first mixture with the highest refractive index to constitute the core, depositing layer(s) of respective decreasing refractive indices on said core, interdiffusing each layer with the adjoining layer(s), and crosslinking the polymer P and the monomers of the reactive diluting agent.

* * * * *